(12) United States Patent
Burton et al.

(10) Patent No.: US 6,738,865 B1
(45) Date of Patent: May 18, 2004

(54) METHOD, SYSTEM, AND PROGRAM FOR DEMOTING DATA FROM CACHE BASED ON LEAST RECENTLY ACCESSED AND LEAST FREQUENTLY ACCESSED DATA

(75) Inventors: David Alan Burton, Vail, AZ (US); Erez Webman, Petach-Tikva (IL)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 09/591,916

(22) Filed: Jun. 9, 2000

(51) Int. Cl.$^7$ .............................................. G06F 12/00
(52) U.S. Cl. ........................ 711/133; 711/145; 711/159; 711/207
(58) Field of Search ................................. 711/133, 134, 711/136, 118, 145, 159, 207, 160, 202, 135

(56) References Cited

U.S. PATENT DOCUMENTS

| | | | |
|---|---|---|---|
| 5,150,472 A | 9/1992 | Blank et al. ................ | 711/137 |
| 5,432,917 A | 7/1995 | Parikh ........................ | 711/160 |
| 5,481,691 A | 1/1996 | Day, III et al. ............. | 711/133 |
| 5,682,500 A | 10/1997 | Vishlitzky et al. .......... | 711/113 |
| 5,751,993 A | 5/1998 | Ofek et al. .................. | 711/136 |
| 5,761,717 A | 6/1998 | Vishlitzky et al. .......... | 711/136 |
| 5,778,442 A * | 7/1998 | Ezzat et al. .................. | 711/159 |
| 5,924,116 A | 7/1999 | Aggarwal et al. .......... | 711/122 |
| 6,012,126 A * | 1/2000 | Aggarwal et al. .......... | 709/203 |
| 6,266,742 B1 * | 7/2001 | Challenger et al. ......... | 711/133 |
| 6,378,043 B1 * | 4/2002 | Girkar et al. ............... | 711/133 |
| 6,470,419 B2 * | 10/2002 | Take et al. .................. | 711/113 |
| 6,487,638 B2 * | 11/2002 | Dawkins et al. ............ | 711/133 |

FOREIGN PATENT DOCUMENTS

| | | | | |
|---|---|---|---|---|
| EP | 604015 A3 | 11/1993 | | |
| EP | 604015 A2 | 11/1993 | | |
| JP | 60-214060 | * 10/1985 | ............ | G06F/12/08 |
| JP | 63-199344 | 12/1988 | | |
| JP | 04-051342 | 2/1992 | | |
| JP | 04-077844 | 3/1992 | | |
| JP | 04-314150 | 11/1992 | | |
| JP | 05-040698 | 2/1993 | | |
| JP | 06-083713 | 3/1994 | | |
| JP | 06-089221 | 3/1994 | | |
| JP | 7-506923 | 7/1995 | | |
| JP | 08-044625 | 2/1996 | | |
| JP | 08-069418 | 3/1996 | | |
| JP | 10-269028 | 10/1998 | | |
| JP | 11-065862 | 3/1999 | | |
| JP | 2000035934 A | * 2/2000 | ............ | G06F/12/00 |
| JP | 2000-047942 | 2/2000 | | |
| JP | 2000-148515 | * 5/2000 | ............ | G06F/12/08 |
| JP | 2003044510 A | * 2/2003 | ............ | G06F/12/00 |

OTHER PUBLICATIONS

Application No. 2001–170848, "Notification of Reasons for Refusal", Apr. 2003.*

Great Britain Search Report, date of search Feb. 14, 2002.

* cited by examiner

*Primary Examiner*—Pierre Michel Bataille
(74) *Attorney, Agent, or Firm*—David W. Victor; Konrad Raynes & Victor LLP

(57) ABSTRACT

Disclosed is a method, system, and program for caching data. Data from a device, such as a volatile memory device or non-volatile storage device, is maintained in entries in a cache. For each entry in cache, a variable indicates both a time when the cache entry was last accessed and a frequency of accesses to the cache entry.

The variable is used in determining which entry to denote from cache to make room for subsequent entries.

21 Claims, 3 Drawing Sheets

US 6,738,865 B1

METHOD, SYSTEM, AND PROGRAM FOR DEMOTING DATA FROM CACHE BASED ON LEAST RECENTLY ACCESSED AND LEAST FREQUENTLY ACCESSED DATA

BACKGROUND OF THE INVENTION

1. Field of the Invention

The present invention relates to a method, system, and program for managing data in cache and selecting cache entries for demotion to make room for subsequently accessed data.

2. Description of the Related Art

In a memory cache, pages or tracks of data are copied from a storage device, such as a hard disk drive or other non-volatile storage device typically comprised of a magnetic medium, and placed into a volatile, electronic memory area referred to as cache. When tracks or data are accessed from the storage device they are loaded into cache and returned to the application requesting the data. Because the accessed data remains in cache, a subsequent request for the data can be returned from cache, which is substantially faster than retrieving the data from the storage device. Returning data from cache, referred to as a cache hit, improves performance and system throughput because a cache memory by definition provides faster access to data. A cache may also be used to provide faster access to a main volatile memory, such as a random access memory (RAM). For instance, many processors include an "on-board" cache that caches data from RAM for the processor to use and subsequently access from the faster cache memory. In both cases, disk caching and memory caching, the cache provides a high speed memory from which data may be returned faster than the storage device or main memory where the data is maintained.

After the cache utilization reaches a certain upper limit, the cache manager will demote data from cache to make room for subsequently accessed tracks. Areas of cache marked as demoted may then be overwritten by new data, thus making room for data more recently accessed from storage. In the prior art, a least recently used (LRU) algorithm is used as follows. When a track is added to a cache, a pointer to the track in cache is placed at a top of the LRU linked list. If a track already in cache is again accessed, then the pointer to that track in cache is placed at the top of the LRU list. When the cache manager determines that data must be demoted or removed from cache to make room for subsequent data accesses, the cache manager will demote tracks whose pointers are at the bottom of the list, representing those tracks that were accessed the longest time ago relative to other tracks in cache.

This prior art LRU approach works sufficiently well with sequentially accessed data, that is data that is accessed contiguously. However, such LRU algorithms are not optimal for randomly accessed data, that is tracks of storage accessed out of sequence. In such case, a demoted track in cache, even though it is the least recently accessed, may have been accessed more frequently than other tracks and is, thus, more likely to be subsequently accessed than those tracks in cache less frequently accessed. Thus, the LRU approach does not consider the frequency of access to cache entries when selecting entries for demotion.

Thus, there is a need in the art to improve cache hits, i.e., the read requests returned from cache to increase performance and data throughput.

SUMMARY OF THE PREFERRED EMBODIMENTS

To overcome the limitations in the prior art described above, preferred embodiments disclose a method, system, and program for caching data. Data from a device, such as a volatile memory device or non-volatile storage device, is maintained in entries in a cache. For each entry in cache, a variable indicates both a time when the cache entry was last accessed and a frequency of accesses to the cache entry.

In further embodiments, a determination is made when a number of entries in cache has reached a threshold. In response to reaching the threshold, a determination is made of a plurality of cache entries having a relatively low value for the variable with respect to the value of the variable for other cache entries. A relatively low variable value indicates that the cache entry is one of a least recently accessed entry and/or least frequently accessed entry. Those determined cache entries having the relatively low value for the variable are demoted from cache.

In still further embodiments, the variable for a cache entry is increased whenever the cache entry is accessed.

Preferred embodiments provide an algorithm and data structures for maintaining for each cache entry a ranking or variable indicating a time when the entry was last accessed and the number of accesses relative to other cache entries. This variable is used in determining which entries to demote from cache to make room for subsequently accessed data. Preferred embodiments would tend to demote among the entries that were least recently accessed those entries that are less frequently accessed. This methodology improves the cache hit ratio because an entry that is more frequently accessed relative to another entry is more likely to be accessed again in the future. Thus, the preferred methodology would select for demotion those entries less likely to be accessed in the future with respect to other entries. This is an improvement over prior art techniques that do not take into account the frequency of access when demoting cache entries.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
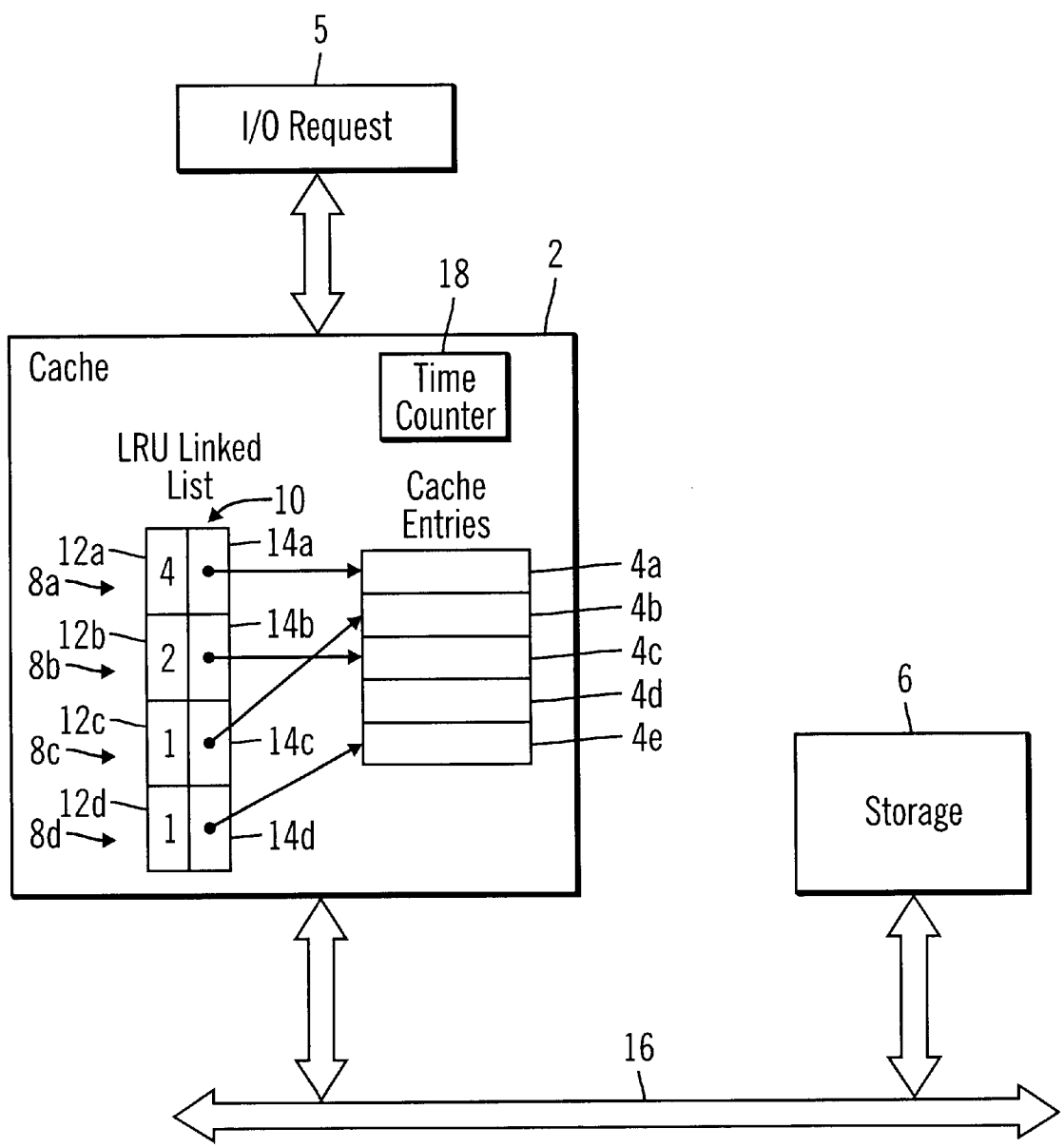
FIG. 1 illustrates a cache architecture in accordance with preferred embodiments of the present invention.

FIG. 1 illustrates a cache architecture in which preferred embodiments are implemented. A cache 2 includes cache entries 4a, b, c, d into which tracks or pages of data from the storage 6 may be placed. When a track or page of data is staged into a cache entry 4a, b, c, d, a new entry 8a is added to the top of the LRU linked list 10. For each cache entry 4a, b, c, d, the LRU linked list 10 includes one entry 8a, b, c, d. Each entry 8a, b, c, d in the LRU linked list 10 includes a LRU rank value 12a, b, c, d and pointer 14a, b, c, d to one cache entry 4a, b, c, d, which may comprise a page if the storage is a memory device or a track if the storage 6 is a disk drive or other non-volatile magnetic storage medium. Further, when an input/output request 5 is serviced from cache, i.e., a cache hit, then the entry 8a, b, c, d in the LRU linked list 6 including the pointer to the accessed cache entry 4a, b, c, d is moved to the top of the LRU linked list 8. Although the cache 2 is only shown as having a few cache entries 4a, b, c, d and corresponding entries 8a, b, c, d in the LRU linked list 10, in practice there are likely thousands of cache entries and entries in the LRU linked list 10. A bus 16 provides a data path between the cache 2 and storage 6. The cache 2 further maintains a time counter 18 that is used in calculating the LRU rank 12a, b, c, d.

The LRU rank 12a, b, c, d provides a value for each entry 4a, b, c, d in cache 2 that indicates both how frequently the entry is accessed and the time of last access. The purpose of this weighting is to allow the process demoting entries 4a, b, c, d from cache 2 to take into account the frequency with which an entry was accessed and remove those less frequently accessed entries. Demoting relatively less frequently accessed entries increases the likelihood of a cache hit because data that has a history of being accessed more frequently is more likely to be accessed in the future over less frequently accessed entries.

Figure 2:
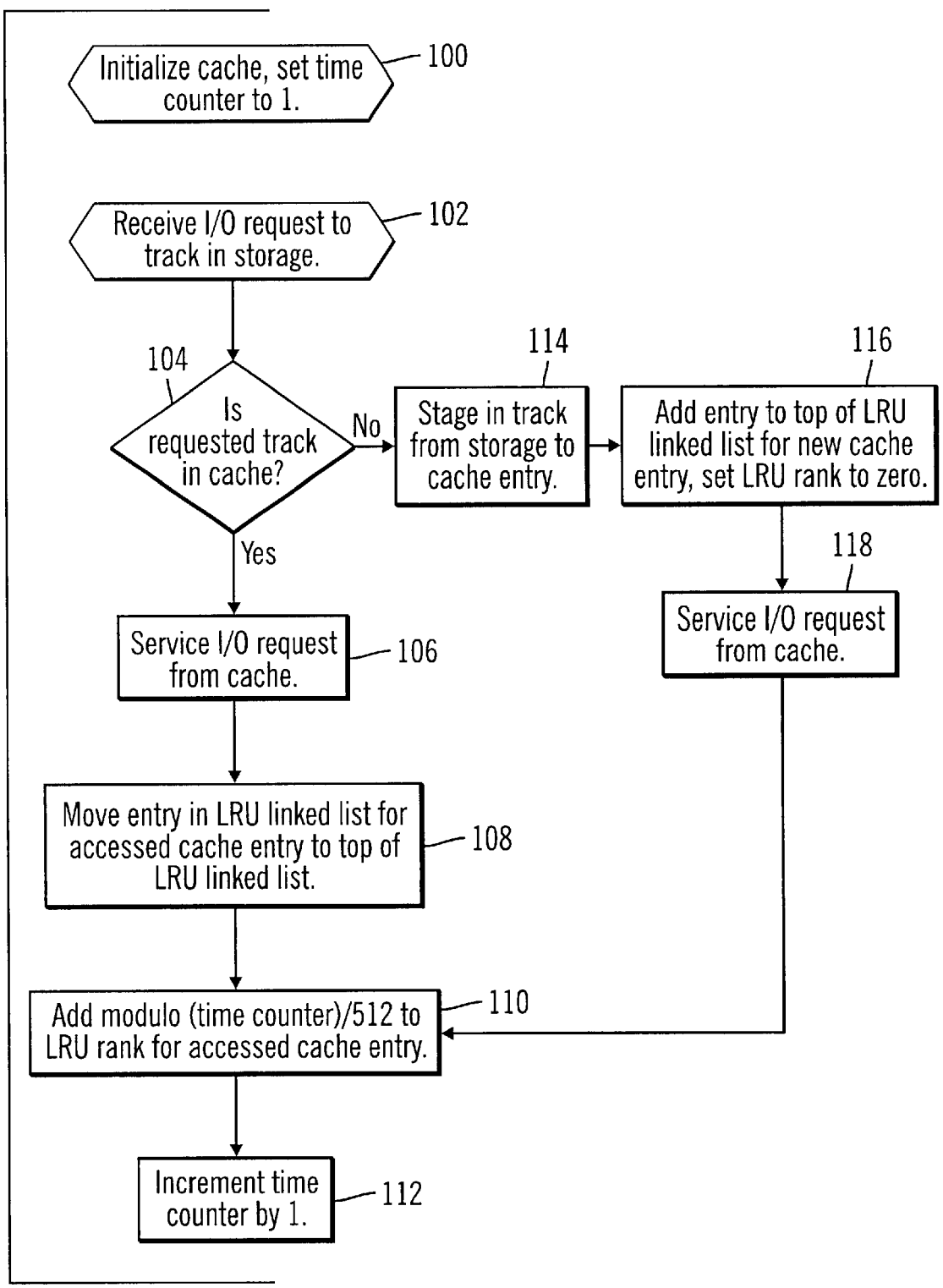
FIGS. 2 and 3 illustrate cache management logic in accordance with preferred embodiments of the present invention.

FIG. 2 illustrates logic implemented in a cache controller or control logic (not shown), referred to herein as the cache 2, to manage the entries in cache 2. Control begins at block 100 with the initiation of cache management activities by initializing the cache 2 and setting the timer counter to one. At block 102, the cache 2 receives an I/O request 5 for a track in storage 6, or in cases where the cache is caching data from a memory device, a page from memory. Still further, the cache 2 could receive a request for a page of data. If the requested track is in cache 2 as a cache entry 4a, b, c, d (at block 104), then the cache 2 services (at block 106) the I/O request 5 directly from cache 2. For a read request, the cache 2 would return the requested data to the entity requesting the data; for a write request the cache 2 would update the write data to the track location in cache. The cache 2 would then move (at block 108) the entry 8a, b, c, d in the LRU linked list 10 corresponding to the cache entry 4a, b, c, d subject to the I/O request 5 to the top of the LRU linked list 10. The cache then adds (at block 110) the modulo of the time counter 18 divided by 512 to the LRU rank 12a, b, c, d of the LRU entry 8a, b, c, d moved to the top of the LRU linked list 10. In alternative embodiments, the time counter 18 may be divided by other values. The time counter 18 is then incremented by one (at block 112).

If the requested track is not in cache, then the cache 2 stages (at block 114) the requested track from storage to a cache entry 4a, b, c, d and adds (at block 116) the LRU entry 8a, b, c, d for the new cache entry 4a, b, c, d to the top of LRU list 10. The LRU rank for the added cache entry is then set to zero. The I/O request 5 is then serviced (at block 118) from cache 2. Control then transfers to block 110 to set the LRU rank 12a, b, c, d for the new entry.

The above LRU rank is weighted for previous accesses. Because the time counter 18 is incremented for every I/O access, the value added to the LRU rank for subsequently accessed cache entries increases substantially in a short period of time. Thus, LRU entries recently accessed or added to cache will have a substantially higher LRU rank than the LRU rank of entries that have not been accessed recently, even those entries accessed numerous times. However, to the extent entries have not been accessed for the same amount of time, the entry that was accessed more frequently will have a higher LRU rank because its LRU rank will be weighted with previous accesses. Thus, to the extent entries were last accessed at about the same time, which in terms of cache operations is within fractions of a second of each other, the more frequently accessed entry will have a greater weighting. As discussed, a cache entry more frequently accessed in the past is likelier to be accessed in the future over less frequently accessed entries that were last accessed at about the same time.

Figure 3:
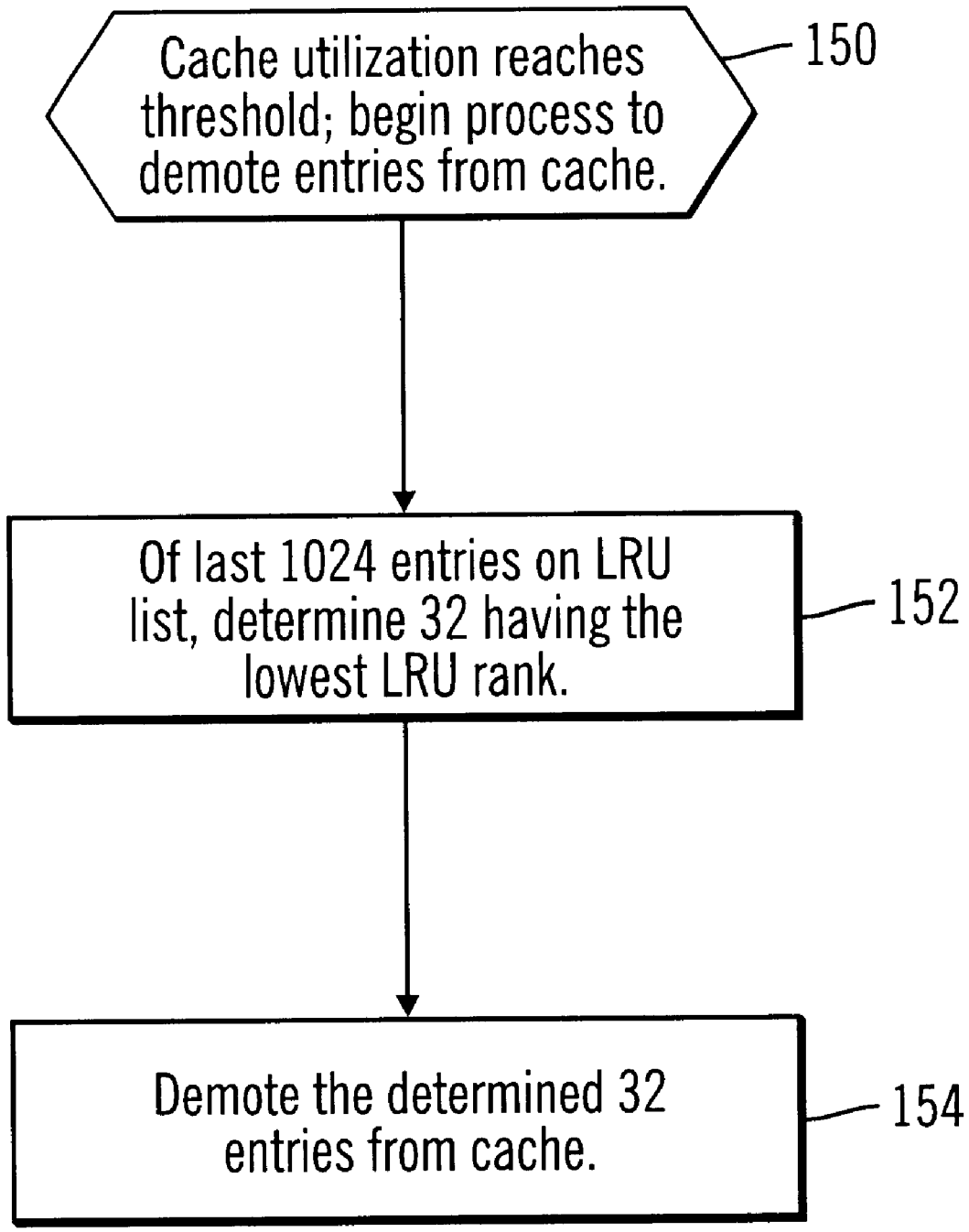

FIG. 3 illustrates logic implemented in the cache 2 to demote entries in cache. At block 150 the cache 2 utilization, i.e., number of cached entries, reaches an upper threshold. In response, the cache determines (at block 152) from the last 1024 entries in the LRU linked list 8, thirty-two entries that have the lowest LRU rank 12a, b, c, d. The cache 2 then demotes (at block 152) those determined thirty-two entries from cache 2. Once a track is demoted, if it is dirty data, i.e., updates to locations in storage 6, then the data will be destaged to storage 6. Once dirty data is destaged or if the data is not an update to the track in storage 6, then the cache entry 4a, b, c, d is marked as available to receive new tracks staged in from the storage 6.

As discussed, those entries having the lowest LRU rank marked for demotion are both the least recently accessed and among those entries least recently accessed recently, are less frequently accessed. Thus, the algorithm of FIGS. 2 and 3 ensures that more frequently accessed cache entries 4a, b, c, d remain in cache longer. Because a more frequently accessed entry is more likely to be subsequently accessed over less frequently accessed entries last accessed at about the same time, the preferred embodiment cache demotion scheme will improve the cache hit ratio as those entries more frequently accessed are less likely to be demoted from cache 2. In fact, in performance tests, it has been found that the throughput and performance of systems employing the cache management scheme of the preferred embodiments has improved 5–10% over systems that employ the prior art LRU demotion method.

Conclusion

The following describes some alternative embodiments for accomplishing the present invention.

The preferred embodiments may be implemented as a method, apparatus or program using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, programmable logic, memory devices (e.g., EEPROMs, ROMs, PROMs, RAMs, SRAMs, etc.) carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such signal-bearing media, when carrying computer-readable instructions that direct the functions of the present invention, represent alternative embodiments of the present invention.

As discussed, the cache management scheme of the preferred embodiments may be employed in a disk cache that provides high speed storage of data accessed from a storage device, such as a hard disk drive, tape, optical disk or any other magnetic storage medium or in a memory cache that caches data from a slower memory device, such as the main memory.

The preferred embodiment cache may comprise a set associative cache, direct mapped cache, fully associative cache or any and other cache designs known in the art. Still further, the cache may comprise a battery backed up cache, also referred to as a non-volatile storage unit.

The preferred logic of FIGS. 2 and 3 describes specific operations occurring in a particular order. In alternative embodiments, certain of the logic operations may be performed in a different order, modified or removed and still implement preferred embodiments of the present invention. Morever, steps may be added to the above described logic and still conform to the preferred embodiments. Further, operations described herein may occur sequentially or certain operations may be processed in parallel.

Preferred embodiments described a specific technique for weighting a variable with the frequency a track or page of data in cache has been accessed. In alternative embodiments, different algorithms may be used to factor in both the time of the most recent access and the frequency of accesses to an entry in cache.

In preferred embodiments, a LRU linked list was maintained for cache entries. In alternative embodiments, different queue structures, other than LRU linked lists, may be used in managing the data in cache.

In summary, preferred embodiments disclose a method, system, and program for caching data. Data from a device, such as a volatile memory device or non-volatile storage device, is maintained in entries in a cache. For each entry in cache, a variable indicates both a time when the cache entry was last accessed and a frequency of accesses to the cache entry.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for caching data, comprising:
   means for maintaining data from a device in entries in a cache;
   means for maintaining, for each entry in cache, a variable indicating both a time when the cache entry was last accessed and a frequency of accesses to the cache entry, wherein the entries are ranked in one ranked list associated with the entries and the corresponding variables,
   means for maintaining a single time counter, wherein the time counter is for all entries in the cache, and wherein the time counter is used in calculating a least recently used rank;
   means for receiving an access to one cache entry;
   means for increasing the variable for the accessed cache entry by adding the time counter to the variable for the accessed cache entry in response to the access to the cache entry; and
   means for incrementing the time counter whenever one cache entry is accessed.

2. The system of claim 1, further comprising:
   means for determining that a number of entries in cache has reached a threshold;
   means for determining a plurality of cache entries having a relatively low value for the variable with respect to the value of the variable for other cache entries in response to the number of cache entries reaching the threshold, wherein a relatively low variable value indicates that the cache entry is at least one of a least recently accessed entry and least frequently accessed entry; and
   means for demoting from cache those determined cache entries having the relatively low value for the variable.

3. The system of claim 1, further comprising:
   means for performing an operation on the time counter resulting in a value, wherein the means for increasing the variable adds the value to the variable for the accessed cache entry.

4. The system of claim 3, wherein the operation performed on the time counter comprises dividing the time counter by a constant, wherein the resulting value comprises the modulo of the time counter divided by the constant.

5. The system of claim 1, further comprising:
   means for maintaining an entry in a least recently used (LRU) linked list for each cache entry, wherein a recently accessed cache entry is placed at a top of the LRU linked list and least recently used cache entries are demoted from a bottom of the LRU linked list.

6. The system of claim 5, further comprising:
   means for determining that a number of entries in cache has reached a threshold;
   means for determining a plurality of cache entries at the bottom of the LRU linked list that have a relatively low value for the variable with respect to the value of the variable for other cache entries, wherein a relatively low variable value for the cache entries at the bottom of the LRU linked list indicates that the cache entry has been at least one of a least recently accessed entry and least frequently accessed entry; and
   means for demoting from cache those determined cache entries having the relatively low value for the variable.

7. The system of claim 1, wherein the device comprises a volatile memory device or a non-volatile storage device.

8. A method for caching data, comprising:
   maintaining data from a device in entries in a cache;
   for each entry in cache, maintaining a variable indicating both a time when the cache entry was last accessed and a frequency of accesses to the cache entry, wherein the entries are ranked in one ranked list associated with the entries and the corresponding variables;
   maintaining a single time counter, wherein the time counter is for all entries in the cache, and wherein the time counter is used in calculating a least recently used rank;
   receiving an access to one cache entry;
   in response to the access to the cache entry, increasing the variable for the accessed cache entry by adding the time counter to the variable for the accessed cache entry; and
   incrementing the time counter whenever one cache entry is accessed.

9. The method of claim 8, further comprising:
   determining that a number of entries in cache has reached a threshold;
   in response to the number of cache entries reaching the threshold, determining a plurality of cache entries having a relatively low value for the variable with respect to the value of the variable for other cache entries, wherein a relatively low variable value indicates that the cache entry is at least one of a least recently accessed entry and least frequently accessed entry; and demoting from cache those determined cache entries having the relatively low value for the variable.

10. The method of claim 8, further comprising:

performing an operation on the time counter resulting in a value, wherein increasing the variable comprises adding the value to the variable for the accessed cache entry.

11. The method of claim 10, wherein the operation performed on the time counter comprises dividing the time counter by a constant, wherein the resulting value comprises the modulo of the time counter divided by the constant.

12. The method of claim 8, further comprising:

for each cache entry, maintaining an entry in a least recently used (LRU) linked list, wherein a recently accessed cache entry is placed at a top of the LRU linked list and least recently used cache entries are demoted from a bottom of the LRU linked list.

13. The method of claim 12, further comprising:

determining that a number of entries in cache has reached a threshold;

determining a plurality of cache entries at the bottom of the LRU linked list that have a relatively low value for the variable with respect to the value of the variable for other cache entries, wherein a relatively low variable value for the cache entries at the bottom of the LRU linked list indicates that the cache entry has been at least one of a least recently accessed entry and least frequently accessed entry; and demoting from cache those determined cache entries having the relatively low value for the variable.

14. The method of claim 8, wherein the device comprises a volatile memory device or a non-volatile storage device.

15. An information bearing medium for managing data in cache, wherein the information bearing medium includes logic for causing a cache control unit to perform:

maintaining data from a device in entries in a cache;

for each entry in cache, maintaining a variable indicating both a time when the cache entry was last accessed and a frequency of accesses to the cache entry, wherein the entries are ranked in one ranked list associated with the entries and the corresponding variables;

maintaining a single time counter, wherein the time counter is for all entries in the cache, and wherein the time counter is used in calculating a least recently used rank;

receiving an access to one cache entry;

in response to the access to the cache entry, increasing the variable for the accessed cache entry by adding the time counter to the variable for the accessed cache entry; and incrementing the time counter whenever one cache entry is accessed.

16. The information bearing medium of claim 15, further causing the cache control unit to perform:

determining that a number of entries in cache has reached a threshold;

in response to the number of cache entries reaching the threshold, determining a plurality of cache entries having a relatively low value for the variable with respect to the value of the variable for other cache entries, wherein a relatively low variable value indicates that the cache entry is at least one of a least recently accessed entry and least frequently accessed entry; and demoting from cache those determined cache entries having the relatively low value for the variable.

17. The information bearing medium of claim 15, further causing the cache control unit to perform:

performing an operation on the time counter resulting in a value, wherein increasing the variable comprises adding the value to the variable for the accessed cache entry.

18. The information bearing medium of claim 17, wherein the operation performed on the time counter comprises dividing the time counter by a constant, wherein the resulting value comprises the modulo of the time counter divided by the constant.

19. The information bearing medium of claim 15, further causing the cache control unit to perform:

for each cache entry, maintaining an entry in a least recently used (LRU) linked list, wherein a recently accessed cache entry is placed at a top of the LRU linked list and least recently used cache entries are demoted from a bottom of the LRU linked list.

20. The information bearing medium of claim 19, further causing the cache control unit to perform:

determining that a number of entries in cache has reached a threshold;

determining a plurality of cache entries at the bottom of the LRU linked list that have a relatively low value for the variable with respect to the value of the variable for other cache entries, wherein a relatively low variable value for the cache entries at the bottom of the LRU linked list indicates that the cache entry has been at least one of a least recently accessed entry and least frequently accessed entry; and demoting from cache those determined cache entries having the relatively low value for the variable.

21. The information bearing medium of claim 15, wherein the device comprises a volatile memory device or a non-volatile storage device.

* * * * *